US010257128B2

(12) United States Patent
Tang et al.

(10) Patent No.: US 10,257,128 B2
(45) Date of Patent: Apr. 9, 2019

(54) PRESENTING MESSAGES TO PARTICIPANTS BASED ON NEIGHBORHOODS

(71) Applicant: Microsoft Technology Licensing, LLC, Redmond, WA (US)

(72) Inventors: John C. Tang, Palo Alto, CA (US); Gina Danielle Venolia, Bellevue, WA (US); Kori Marie Inkpen, Redmond, WA (US); Matthew Knudsen Miller, Warman (CA); Gerard Wilkinson, Newcastle Upon Tyne (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 164 days.

(21) Appl. No.: 15/362,533

(22) Filed: Nov. 28, 2016

(65) Prior Publication Data
US 2018/0152397 A1    May 31, 2018

(51) Int. Cl.
G06F 15/16     (2006.01)
G06F 15/173    (2006.01)
H04L 12/58     (2006.01)
H04L 12/18     (2006.01)

(52) U.S. Cl.
CPC .......... H04L 51/04 (2013.01); H04L 12/1813 (2013.01); H04L 51/14 (2013.01); H04L 51/32 (2013.01)

(58) Field of Classification Search
CPC ............................. H04L 51/04; H04L 12/1813
USPC .................................................. 709/207, 224
See application file for complete search history.

(56) References Cited

U.S. PATENT DOCUMENTS 7,107,544 B1    9/2006   Luke
7,478,129 B1    1/2009   Chemtob
7,734,695 B2    6/2010   Kelley et al.
(Continued)

OTHER PUBLICATIONS

Kakadiya, et al.,"Sending Chat Messages to New Columns in Group Chat Sessions", Published on: Jun. 16, 2015, 2 pages Available at: https://priorart.ip.com/IPCOM/000242061.
(Continued)

*Primary Examiner* — Karen C Tang
(74) *Attorney, Agent, or Firm* — Goff IP Law PLLC; Jared S. Goff

(57) ABSTRACT

Participants of a group of participants in a chat may be associated with neighborhoods. A neighborhood associated with a participant includes a subset of the participants and represents the participants whose messages the associated participant can see in the chat. When a participant generates a message, the message is presented to an audience that includes each participant with the participant that generated the message in their associated neighborhood. As the message receives indications of approval (e.g., "likes"), the size of the audience is increased to include additional participants. Once the message receives a threshold number of indications of approval, the message may be displayed to all of the participants in the chat. The size of the neighborhoods may be dynamically adjusted based on the number of messages that are generated in each neighborhood to keep the number of messages that are presented within a predetermined range.

20 Claims, 10 Drawing Sheets

(56) References Cited

U.S. PATENT DOCUMENTS

| | | | |
|---|---|---|---|
| 8,255,396 B2* | 8/2012 | Sandoval | G06F 17/30569 |
| | | | 707/732 |
| 8,490,003 B2 | 7/2013 | Khadilkar et al. | |
| 8,607,262 B2* | 12/2013 | Hallberg | H04N 7/17318 |
| | | | 725/14 |
| 8,616,970 B2 | 12/2013 | Ducheneaut et al. | |
| 8,793,154 B2 | 7/2014 | Evans et al. | |
| 9,030,523 B2 | 5/2015 | Talukder | |
| 9,262,531 B2 | 2/2016 | Ferren et al. | |
| 9,792,457 B2* | 10/2017 | Tung | G06F 21/6245 |
| 2003/0227479 A1 | 12/2003 | Mizrahi et al. | |
| 2007/0300169 A1 | 12/2007 | Jones et al. | |
| 2008/0028031 A1 | 1/2008 | Bailey et al. | |
| 2008/0117201 A1* | 5/2008 | Martinez | G06F 17/30035 |
| | | | 345/418 |
| 2008/0201411 A1* | 8/2008 | Paritosh | H04L 51/12 |
| | | | 709/203 |
| 2008/0201731 A1* | 8/2008 | Howcroft | H04H 60/46 |
| | | | 725/13 |
| 2010/0241507 A1* | 9/2010 | Quinn | G06Q 30/02 |
| | | | 705/14.42 |
| 2011/0289433 A1* | 11/2011 | Whalin | G06F 17/30964 |
| | | | 715/753 |
| 2014/0047049 A1 | 2/2014 | Poston et al. | |
| 2014/0074623 A1* | 3/2014 | Mohammadi | G06Q 30/0269 |
| | | | 705/14.66 |
| 2014/0122622 A1* | 5/2014 | Castera | H04L 51/32 |
| | | | 709/206 |
| 2014/0214558 A1* | 7/2014 | Varghese | G06Q 30/0277 |
| | | | 705/14.73 |
| 2015/0058957 A1* | 2/2015 | Halliday | H04W 4/02 |
| | | | 726/7 |
| 2015/0188873 A1* | 7/2015 | Halliday | H04W 4/21 |
| | | | 709/206 |
| 2015/0244538 A1 | 8/2015 | Alexander et al. | |
| 2015/0258446 A1* | 9/2015 | Billings | G07F 17/3272 |
| | | | 463/42 |
| 2015/0367233 A1* | 12/2015 | Hicks | A63F 13/87 |
| | | | 463/31 |
| 2016/0028846 A1* | 1/2016 | Coglitore | H04L 67/2842 |
| | | | 709/204 |
| 2016/0286244 A1* | 9/2016 | Chang | H04N 21/21805 |
| 2016/0359946 A1* | 12/2016 | Hintermeister | H04L 67/02 |
| 2016/0371271 A1* | 12/2016 | Bhatia | G06F 17/30867 |
| 2017/0214945 A1* | 7/2017 | Chang | H04H 20/71 |
| 2017/0236086 A1* | 8/2017 | Simon | G06Q 10/06375 |
| | | | 705/7.37 |
| 2017/0270122 A1* | 9/2017 | He | G06F 17/30554 |
| 2017/0323325 A1* | 11/2017 | Hamedi | H04L 67/02 |
| 2017/0353414 A1* | 12/2017 | Ertmann | H04L 51/32 |
| 2018/0020067 A1* | 1/2018 | Sadanandan | H04L 67/26 |
| 2018/0041545 A1* | 2/2018 | Chakra | H04L 51/32 |
| 2018/0054411 A1* | 2/2018 | Halliday | H04W 4/02 |
| 2018/0083905 A1* | 3/2018 | Jayaram | H04L 51/22 |
| 2018/0083907 A1* | 3/2018 | Perlow | H04L 51/22 |
| 2018/0131660 A1* | 5/2018 | Lambert | H04L 51/32 |
| 2018/0146216 A1* | 5/2018 | Chang | H04L 65/4076 |

OTHER PUBLICATIONS

Faieta, et al., "Scalable Online Discussions as Listening Technology", System Sciences, Jan. 23, 2006, IEEE, pp. 1530-1605.

The G1000 case: Innovative hybrid mass consultation with citizens, Synthetron, Nov. 11, 2011, 2 pages.

\* cited by examiner

274

PRESENTING MESSAGES TO PARTICIPANTS BASED ON NEIGHBORHOODS

BACKGROUND

Text chat is a common mechanism for interacting among large numbers of people. Text chat has become a popular interaction medium in conjunction with group streaming activities, such as live streaming lectures, presentations, music events, personal events, and online gaming.

While text chat can be a convenient and lightweight way for people to exchange messages, it can become problematic with large groups, such as those larger than about fifty people. In particular, the number of messages generated by large groups can be overwhelming. This may cause important or insightful messages to be lost in the "noise" of generic or low quality messages, and may discourage some participants from generating messages given the low probability that their messages will be read or appreciated.

SUMMARY

Participants of a group of participants in a chat may be associated with neighborhoods. A neighborhood associated with a participant includes a subset of the participants and represents the participants whose messages the associated participant can see in the chat. When a participant generates a message, the message is presented to an audience, which is initially the same size as the neighborhood. As the message receives indications of approval (e.g., "likes"), the size of the audience is increased to include additional participants. Once the message receives a threshold number of indications of approval, the message may be displayed to all of the participants in the chat, including a broadcaster of an associated live stream. The size of the neighborhoods may be dynamically adjusted based on the number of messages that are generated in each neighborhood to keep the number of messages that are presented within a predetermined range.

In an implementation, a system for displaying messages to participants in group streaming activities is provided. The system includes at least one computing device and a message engine. The message engine is adapted to: receive identifiers of a plurality of participants; for each participant of the plurality of participants, generate a neighborhood for the participant, wherein each neighborhood comprises a subset of participants of the plurality of participants; receive a message generated by a participant of the plurality of participants; generate an audience for the message based on the neighborhoods that include the participant that generated the message, wherein the audience comprises a subset of participants of the plurality of participants; present the message to the participants in the generated audience; receive indications of approval for the presented message; and in response to the received indications of approval, add participants of the plurality of participants to the generated audience and present the message to the added participants.

In an implementation, a method for displaying messages to participants in group streaming activities is provided. The method includes: receiving a message generated by a participant of a plurality of participants by a computing device, wherein each participant is associated with a neighborhood of a plurality of neighborhoods, and each neighborhood includes a subset of the participants of the plurality of participants; generating an audience for the message based on the neighborhoods that include the participant that generated the message by the computing device, wherein the audience comprises a subset of participants of the plurality of participants; presenting the message to the participants in the generated audience by the computing device; receiving indications of approval for the presented message by the computing device; in response to the received indications of approval, adding participants of the plurality of participants to the generated audience by the computing device; presenting the message to the added participants by the computing device; determining that a number of indications of approval received for the presented message exceeds a threshold by the computing device; and in response to the determination, presenting the message to all of the participants of the plurality of participants by the computing device.

In an implementation, a system for displaying messages to participants of group streaming activities is provided. The system includes at least one computing device and a message engine. The message engine is adapted to: receive identifiers of a plurality of participants; for each participant of the plurality of participants, assign the participant to a position of a plurality of positions of a structure, wherein the positions are arranged in a first direction and a second direction around the structure; for each participant of the plurality of participants, generate a neighborhood for the participant, wherein each neighborhood comprises a subset of participants of the plurality of participants, by: selecting participants assigned to a number of positions of the structure in the first direction from the position assigned to the participant associated with the neighborhood; selecting participants assigned to the number of positions of the structure in the second direction from the position assigned to the participant associated with the neighborhood; and adding the selected participants to the neighborhood for the participant; receive a message generated by a participant of the plurality of participants; generate an audience for the message based on the neighborhoods that include the participant that generated the message, wherein the audience comprises a subset of participants of the plurality of participants; and present the message to the participants in the generated audience.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Figure 1:
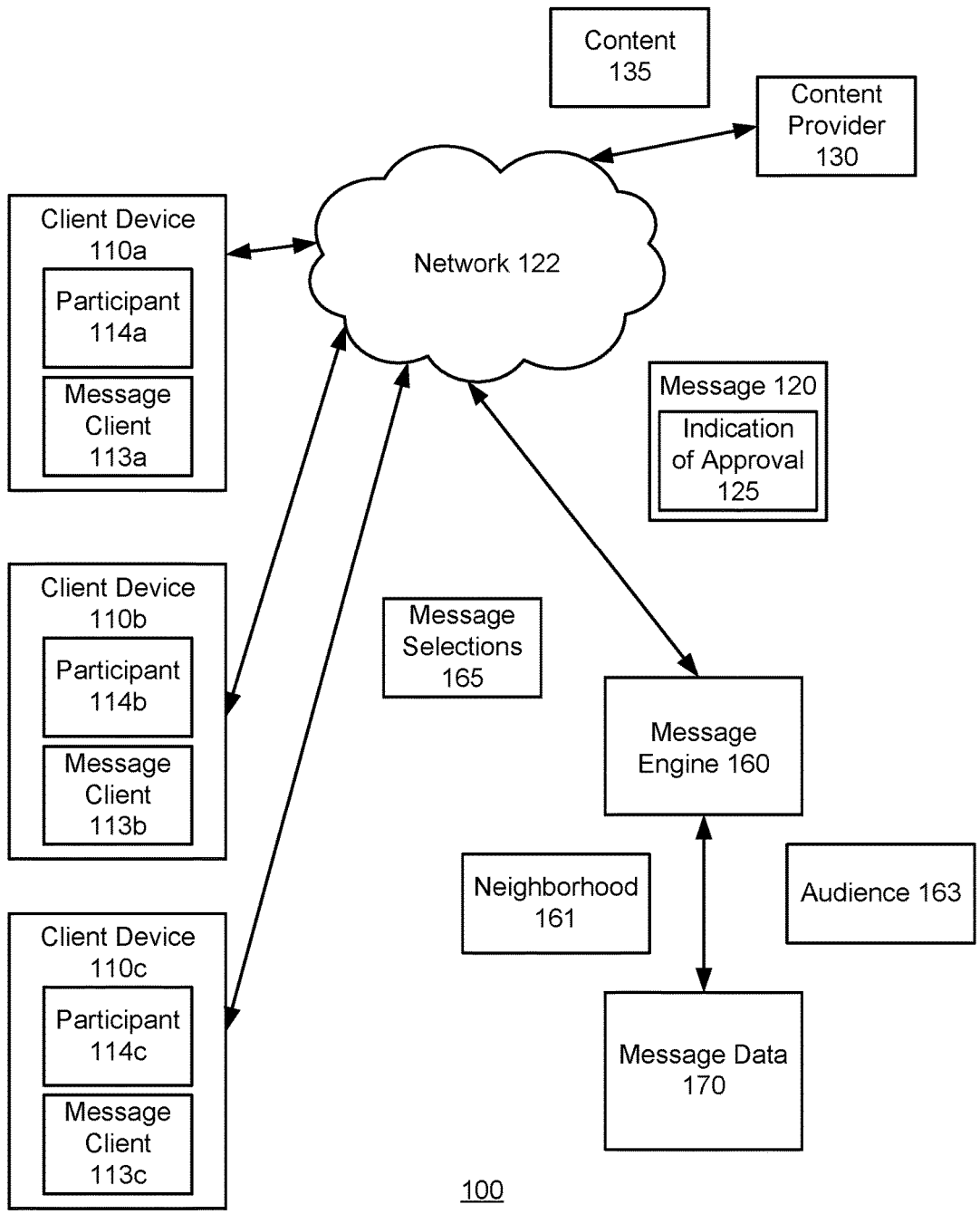
FIG. 1 is an illustration of an exemplary environment for presenting messages to participants.

FIG. 1 is an illustration of an exemplary environment 100 for presenting messages to participants. The environment 100 may include a message engine 160, one or more client devices 110 (i.e., client devices 110*a-c*), and a content provider 130 in communication through a network 122. The network 122 may be a variety of network types including the public switched telephone network (PSTN), a cellular telephone network, and a packet switched network (e.g., the Internet). Although only one message engine 160, and one content provider 130 are shown in FIG. 1, there is no limit to the number of client devices 110, message engines 160, and content providers 130 that may be supported. Similarly, more or less than three client devices 110 may also be supported.

Figure 10:
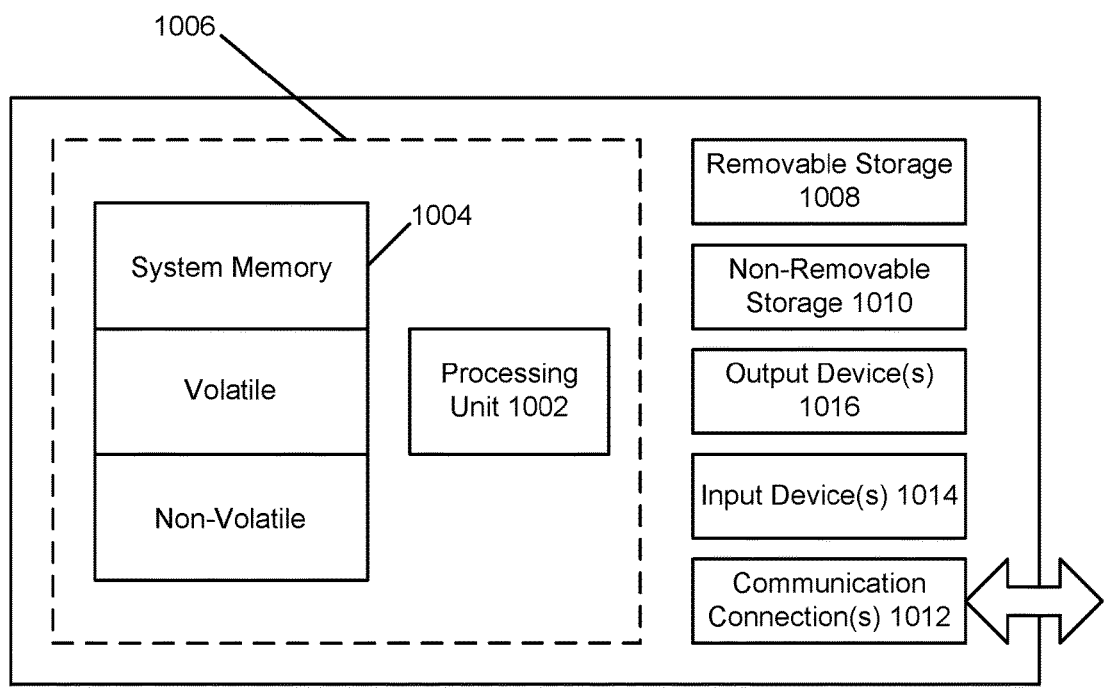
FIG. 10 shows an exemplary computing environment in which example embodiments and aspects may be implemented.

Each client device 110, the message engine 160, and the content provider 130 may be implemented using a variety of computing devices such as smart phones, desktop computers, laptop computers, tablets, and video game consoles. Other types of computing devices may be supported. A suitable computing device is illustrated in FIG. 10 as the computing device 1000.

Each client device 110 may be associated with a participant 114 (i.e., the participants 114*a-c*). A participant 114 may be a user or individual that is participating in a group streaming activity. A group streaming activity may be an activity where participants 114 view content 135 that is provided by the content provider 130, and are able to send and receive messages 120 with other participants 114. Examples of group streaming activities include live videogame broadcasting, and online college classes. Any type of streaming activity may be supported.

In some implementations, the participants 114 may include entities or individuals that are involved in the creation of the content 135. For example, a group streaming activity such as a lecture, the participant 114*a* may be a lecturer and the participants 114*b* and 114*c* may be students. The students may generate messages 120, and the lecturer may view and respond to the generated messages 120 in real-time during the lecture. In another example, a group streaming activity such as a videogame may include the participant 114*a* as a player of the videogame, while the participants 114*b* and 114*c* watch the participant 114*a* play the videogame.

Each client device 110 may further include a message client 113 (i.e., message clients 113*a-c*) that may present the content 135 to the participant 114, and may allow the participant 114 to generate one or more messages 120 for viewing by the other participants 114 who are viewing the same content 135, or are part of the same group streaming activity. The message client 113 may further allow participants 114 to provide indications of approval 125 to displayed messages 120. For example, the indications of approval 125 may include "likes", "thumbs up", "hearts", or any other indication. Other indications of approval 125 may include replying to a message 120, or even reading a message 120.

When the number of participants 114 in a group streaming activity becomes large, the number of messages 120 that are generated by the participants 114 also becomes large. Presenting all of the messages 120 to each of the participants 114 would be overwhelming, and could lead to a poor group streaming experience for the participants 114.

Accordingly, rather than present every message 120 to a participant 114, the message engine 160 may receive the messages 120 generated by the participants 114, and may determine which messages 120 are to be viewed by each of the participants 114. The determined messages 120 may be provided to the message client 113 as the message selections 165. In this way, each participant 114 receives only a subset of the messages 120 generated by the participants 114.

As described further below, the message engine 160 may provide the message selections 165 to the message client 113 using what are referred to herein as neighborhoods 161. Each participant 114 may be associated with a neighborhood 161 that includes a subset of the participants 114. A participant 114 may receive each message 120 generated by the participants 114 in the neighborhood 161 that is associated with the participant 114. Each participant 114 may be included in multiple neighborhoods 161, or in just one neighborhood 161.

The message engine 160 may select participants 114 for a neighborhood 161 associated with a participant 114 in a variety of ways. In some implementations, the message engine 160 may select the participants 114 using social networking information or other descriptive information that may be used to determine participants 114 that know or interact with each other or that have similar interests. In other implementations, the participants 114 may be selected using temporal ordering based on when each participant started viewing the content 135. For example, participants 114 who started viewing the content 135 at approximately the same time may be placed in each other's neighborhood 161. Alternatively, the participants 114 may be randomly selected, may be grouped by organization (e.g., schools or businesses), or may be grouped by geography (e.g., country, state, city, or zip code), for example.

When a message 120 is generated by a participant 114, the message engine 160 may determine which participants to present the message 120 to by determining what is referred to herein as an audience 163 for the message 120. The audience 163 for a message 120 may be a subset of the participants 114. In some implementation, the audience 163 for a message 120 may initially include the same participants 114 as the neighborhood 161 associated with the participant 114 that generated the message 120. Alternatively, the audience 163 may include participants 114 that have associated neighborhoods 161 that include the participant 114 that generated the message 120.

The message engine 160 may distribute the message 120 to all of the message clients 113 that are associated with a participant 114 that is included in the determined audience 163. As the participants 114 in the audience 163 view the message 120, they may provide one or more indications of approval 125 for the provided message 120. In some implementation, as the message 120 receives indications of approval 125, the message engine 160 may increase the number of participants 114 in the audience 163, thereby increasing the number of participants 114 that view the message 120. In this way, the number of participants 114 that can view the message 120 increases based on the number of indications of approval 125 that are received.

In another implementation, the message engine 160 may determine if the number of indications of approval 125 that have been received so far for the message 120 exceeds a threshold, and if so, the message engine 160 may increase the audience 163 for the message 120 to all of the participants 114 in the group streaming activity, or most (e.g., a predetermined percentage or number) of the participants 114 in the group streaming activity (including the content provider 130 that created the content 135).

As may be appreciated, the message engine 160 provides many advantages over the prior art. First, the message engine 160 reduces the number of messages 120 that each participant 114 views through neighborhoods 161, while still allowing all of the participants 114 to generate and view messages 120. This is an improvement over implementations that limit the overall number of participants 114 that may contribute messages 120, only allow highly regarded or ranked participants 114 to contribute messages 120, or only allow paying subscribers to contribute messages 120.

Second, the message engine 160 allows for the audience 163 of a message 120 to be increased in real-time as indications of approval 125 are received during the group streaming activity. This is an improvement over implementations that do not increase the audience 163 of a message during the group streaming activity The message engine 160 is beneficial in implementations where there is a moderator or presenter that can respond to messages 120 generated by participants 114. For example, where the group streaming activity is a lecture, the lecturer may desire to respond to messages 120 such as questions in real-time during the lecture. However, when there are a large number of participants 114, it may be difficult for the lecturer to identify relevant or interesting messages 120 from the vast amounts of messages 120 that are generated. Using the message engine 160 described herein, the lecturer may be presented with messages 120 after they have received some number of indications of approval 125. This allows the lecturer to view the messages 120 that have been judged by the participants 114 to be worth answering, and to respond to those messages 120 during the lecture. This is in contrast with systems where the lecturer responds to messages 120 after the group streaming activity has been completed.

Figure 2:
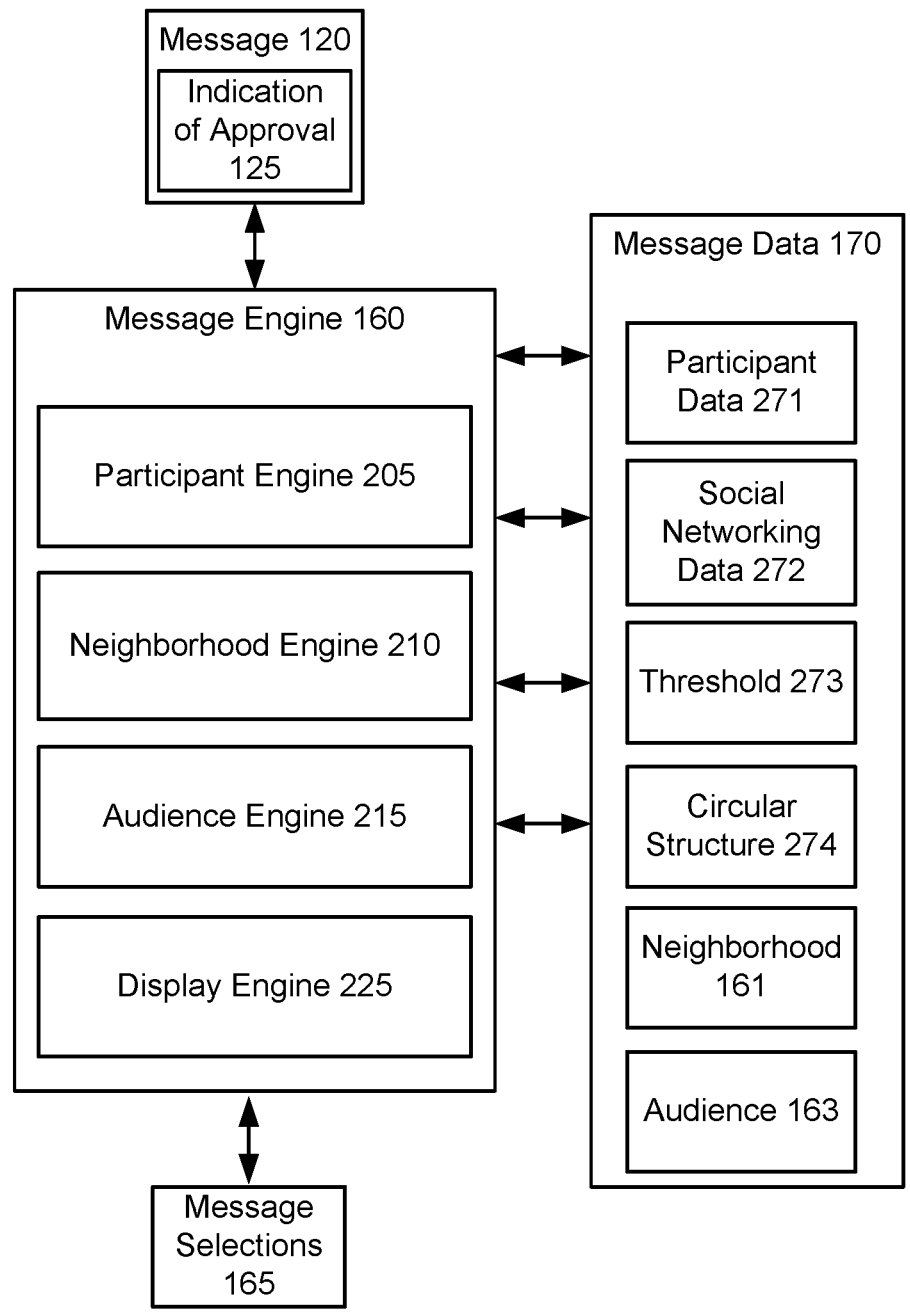
FIG. 2 is an illustration of an implementation of an exemplary message engine.

FIG. 2 is an illustration of an implementation of an exemplary message engine 160. The message engine 160 may include one or more components including a participant engine 205, a neighborhood engine 210, an audience engine 215, and a display engine 225. More or fewer components may be included in the message engine 160. Some or all of the components of the message engine 160 may be implemented by one or more computing devices such as the computing device 1000 described with respect to FIG. 10.

The participant engine 205 may generate and/or receive participant data 271 for each participant 114. The participant data 271 for a participant 114 may include information about of each participant 114 (e.g., occupation, hobbies, interests, geographic location, etc.). Depending on the implementation, the participant data 271 about a participant 114 may be provided by the participant 114 (e.g., in a profile associated with the participant 114), or may be determined or inferred by the participant engine 205. For example, the participant engine 205 may determine the participant data 271 for a participant 114 based on the text of the messages 120 generated by the participant 114, the messages 120 that the participant 114 provided indicators of approval 125 for, and the topics associated with the group streaming activities that are frequented by the participant 114. Other types of signals may be used to generate participant data 271. The participant data 271 may be stored by the participant engine 205 in the message data 170.

The participant engine 205 may further receive social networking data 272 for each participant 114. The social networking data 272 for a participant 114 may be similar to the participant data 271 and may include information from one or more social networking applications such as profile information associated with the participant 114 in the one or more social networking applications, "friends" or contacts of the participant 114 in the one or more social networking applications, participants that are connected to the participant 114 in a social graph associated with the social networking application, and any other information that may be associated with or collected by a social networking application. The social networking data 272 may be stored by the participant engine 205 in the message data 170.

The participant engine 205 may further arrange the participants 114 based on the participant data 271 and/or the social networking data 272. The particular arrangement of the participants 114 may be used by the neighborhood engine 210 and/or the audience engine 215 to generate the neighborhoods 161 and audiences 163, respectively.

In some implementations, the participant engine 205 may arrange the participants 114 using a circular structure 274. The circular structure 274 may be a data structure with a plurality of positions that are arranged along a conceptual circle. Each position may be assigned to one participant 114 of the plurality of participants 114 associated with the group streaming activity. Each position may have an adjacent position in the clockwise direction and the counterclockwise direction with respect to the circular structure 274. Other types of data structures may be used.

Figure 3:
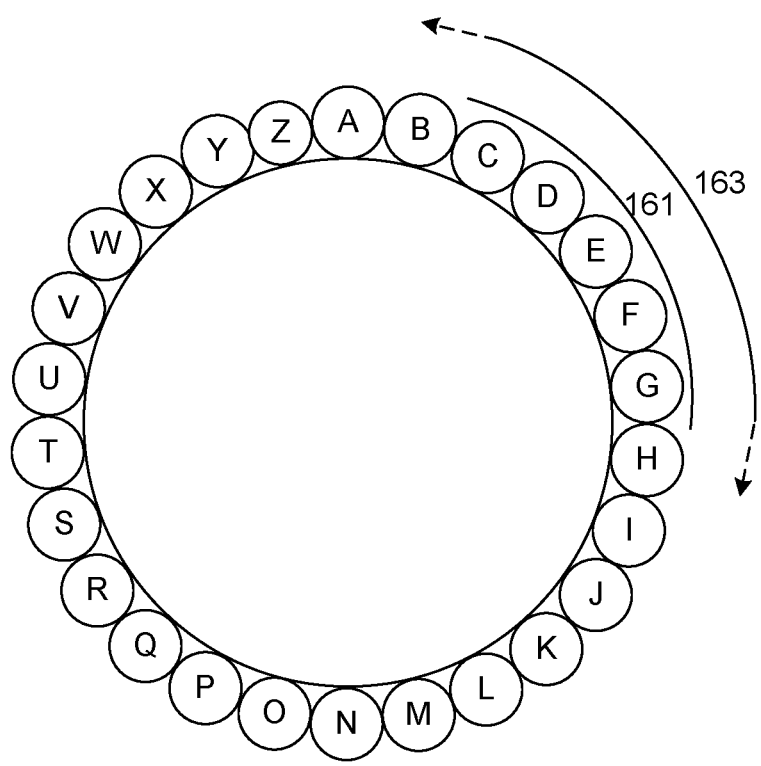
FIG. 3 is an illustration of an example circular structure.

FIG. 3 is an illustration of an example circular structure 274. As shown, the circular structure 274 includes a plurality of positions A-Z arranged around the circular structure 274. With reference to the position C, the position B is adjacent to the position C in the counterclockwise direction, and the position D is adjacent to the position C in the clockwise direction. The number of positions A-Z shown in FIG. 3 is for illustrative purposes only. There is no limit to the number of positions that may be included in the circular structure 274.

The participant engine 205 may arrange the participants 114 in the positions of the circular structure 274 using the participant data 271 and/or social networking data 272 such that participants 114 that know each other, have similar interests, or other characteristics in common (e.g., geography, occupation, language, etc.) are positioned closer together on the circular structure 274 than participants 114 that are dissimilar. In other implementations, the participants 114 may be arranged such that participants 114 that typically generate a large quantity of messages 120 (or generate few messages 120) are evenly distributed across the circular structure 274. Alternatively, the participants 114 may be randomly arranged in the positions of the circular structure 274. Other methods for assigning positions may be used.

In some implementations, the position assigned to each participant 114 may remain unchanged throughout the group streaming activity. While the participant engine 205 may make some changes to account for participants 114 that leave or enter during the group streaming activity, overall the position assigned to each participant 114 may not change. Alternatively, the participant engine 205 may periodically adjust or reassign some or all of the positions based on the messages 120 that are generated. For example, if two close participants 114 both generate a large number of messages 120, one or both may be moved to a new position in the circular structure 274 to balance the number of messages throughout the entire circular structure 274. In another example, if a participant 114 provides indications of approval 125 (or responds to) for messages 120 from a particular other participant 114, one or both may be moved so that the participants 114 are closer together on the circular structure 274. As described further below, close participants 114 are more likely to be in each other's neighborhood 161 than distant participants 114.

The neighborhood engine 210 may associate each of the participants 114 of the group streaming activity with a neighborhood 161. A neighborhood 161 may be a subset of the participants 114 of the group streaming activity. As described above, a participant 114 may view or be presented with all messages 120 generated by the participants 114 in their associated neighborhood 161.

In some implementations, the neighborhood engine 210, for a selected participant 114, may chose the participants 114 for a neighborhood 161 associated with the selected participant 114 using the circular structure 274. In particular, the neighborhood engine 210 may choose participants 114 that are within some predetermined distance from the selected participant in the circular structure 274.

For example, FIG. 3 illustrates an example neighborhood 161 for the participant 114 of the position E. In the example shown, the neighborhood 161 includes participants that are within two positions of the position E in both the clockwise and the counterclockwise direction. Thus, the neighborhood 161 includes the participants 114 corresponding to the positions C, D, F, and G. Alternatively, a neighborhood 161 could include just positions in the clockwise direction, or vice versa.

Initially, the neighborhood engine 210 may make each neighborhood 161 approximately the same size. The size may be selected by a user or an administrator, or may be based on the total number of participants 114 in the group streaming activity. The neighborhoods may not be symmetrical with respect to the circular structure. For example, a neighborhood 161 for the participant in the position E could include the participants associated with the positions B, C, D and F, but not the participant 114 associated with the position G. Other configurations may be used.

As the group streaming activity proceeds and messages 120 are generated, the neighborhood engine 210 may adjust the size of one or more neighborhoods 161. As described above, one of the goals of the message engine 160 is to limit the number of messages 120 that are presented to each participant. Accordingly, if the participant 114a is provided a large number of messages 120, then the neighborhood engine 210 may decrease the size of the neighborhood 161 for the participant 114a. Similarly, if the participant 114b is provided a small number of messages 120, then the neighborhood engine 210 may increase the size of the neighborhood 161 for the participant 114b. The desired number or rate of messages 120 that are received by a participant 114 may be set by a user or administrator, may be set by the participant 114, may be determined algorithmically, and may be changed dynamically.

In other implementations, the neighborhood engine 210 may consider the characteristics of the client device 110 associated with the participant 114 when determining the size of the neighborhood 161. For example, a participant 114 that is using a desktop computer may be able to consider a larger number of messages 120 than a participant 114 that is using a smartphone. Accordingly, a participant 114 associated with the desktop computer may have a larger neighborhood 161 than the participant 114 associated with the smartphone. Other characteristics may also be considered.

For example, returning to the neighborhood 161 of FIG. 3, if the participant E is receiving too few messages 114, the neighborhood engine 210 may increase the size of the neighborhood 161 by adding one or both of the participants 114 associated with the positions B and H. Then at a later time, if the participant E is receiving too many messages, the neighborhood engine 210 may decrease the size of the neighborhood 161 by removing one or both of the participants 114 associated with the positions B and H.

Note that the size of the neighborhood 161 may expand and contract along the circular structure 274 such that same participants 114 are added and removed from the neighborhood 161. By adding and removing the same participants 114 from the neighborhoods 161, the participant 114 may have a more consistent experience with respect to the messages 120 (and authors) that they are presented with during the group streaming activity.

Alternatively, when determining participants 114 to remove from a neighborhood 161, the neighborhood engine 210 may attempt to keep participants 114 that have previously interacted with each other together. For example, participants 114 that have replied to each other's messages 120 in the group streaming activity may be less likely to be removed from the neighborhood 161 than a participant 114 who has not interacted with the other participants 114 in the neighborhood 161. Similarly, the neighborhood engine 210 may consider when each participant 114 entered the group streaming activity when determining participants to remove from the neighborhood 161 such that participants 114 with similar starting times are more likely to remain in the neighborhood 161 than participants 114 with dissimilar starting times. Other factors may be considered.

The audience engine 215 may determine an audience 163 for a message 120. When a message 120 is generated by a participant 114, the audience engine 215 may determine which participants 114 to present the message 120 to. The set of participants 114 that are presented the message 120 is the audience 163.

Similar, to the neighborhood 161, the audience engine 215 may use the circular structure 274 to determine the audience 163 for a message 120. Depending on the implementation, the audience 163 for a message 120 may include each participant 114 that has a neighborhood 161 that includes the participant 114 that generated the message 120.

For example, returning to FIG. 3, assume the participant 114 of the position E generates a message 120. Assuming that a neighborhood 161 for a particular participant 114 includes participants 114 from two positions in the counterclockwise and clockwise direction from the position of the particular participant 114 in the structure 274, the participant 114 in the position E appears in the neighborhoods 161 associated with the participants 114 of the positions C-G. Accordingly, initially an audience 163 for a message 120 generated by the participant 114 of the position E is illustrated in FIG. 3 as the audience 163 that includes participants 114 from the positions C-G.

The audience engine 215 may increase the size of an audience 163 for a message 120 based on received indications of approval 125. Depending on the implementation, the audience engine 215 may compare the indications of approval 125 to certain milestones or goals when increasing the size of the audience 163. For example, after the first five indications of approval 125 are received, the audience engine 215 may increase the number of participants 114 in the audience 163 by one hundred percent. After ten indications of approval 125 are received, the audience engine 215 may increase the number of participants 114 in the audience 163 by two hundred percent. Other number, amounts, and/or rates of increase may be used. How the audience 163 size is increased based on received indications of approval 125 may depend on a variety of factors such as the overall number of messages 120 that are being generated in the group streaming activity, how many participants 114 are in the group streaming activity, and how many indications of approval 125 typical messages 120 are receiving in the group streaming activity, for example. Other factors may be considered.

Returning to FIG. 3, in some implementations, the audience engine 215 may expand the audience 163 by adding participants 114 corresponding to positions that are adjacent to the audience 163 in the clockwise and counterclockwise direction. The direction and expansion of the audience 163 is illustrated by the dotted lines. Thus, the audience 163 may be increased by adding participants 114 corresponding to the position B and the position H. Other methods for increasing an audience 163 may be used.

Depending on the implementation, once the number of indications of approval 125 exceeds a threshold 273, the audience engine 215 may increase the size of the audience 163 to include all of the participants 114 (including a moderator, lecturer, presenter, or leader of the group streaming activity if any). The threshold 273 may be set by a user, an administrator, or algorithmically. Alternatively or additionally, the threshold 273 may be based on a variety of factors such as the overall number of messages 120 that are being generated in the group streaming activity, how many participants 114 are in the group streaming activity, and how many indications of approval 125 typical messages 120 are receiving in the group streaming activity, for example.

The display engine 225 may present the messages 120 to the participants 114 in their corresponding audiences 163 as the message selections 165. The display engine 225 may present the messages 120 of the message selections 165 through a user-interface on the message client 113. In some implementations, the user-interface may have regions where different messages 120 are displayed. For example, the user-interface may have a region where messages 120 that are generated by participants 114 that have a neighborhood 161 in common with the participant 114 associated with the user-interface are displayed, and a region where messages 120 that are generated by participants 114 that do not have a neighborhood 161 in common with the participant 114 associated with the user-interface are displayed. The messages 120 may be displayed directly on the content 135 of the group streaming activity in the user-interface, or may be displayed in a separate region of the user-interface.

Figure 4:
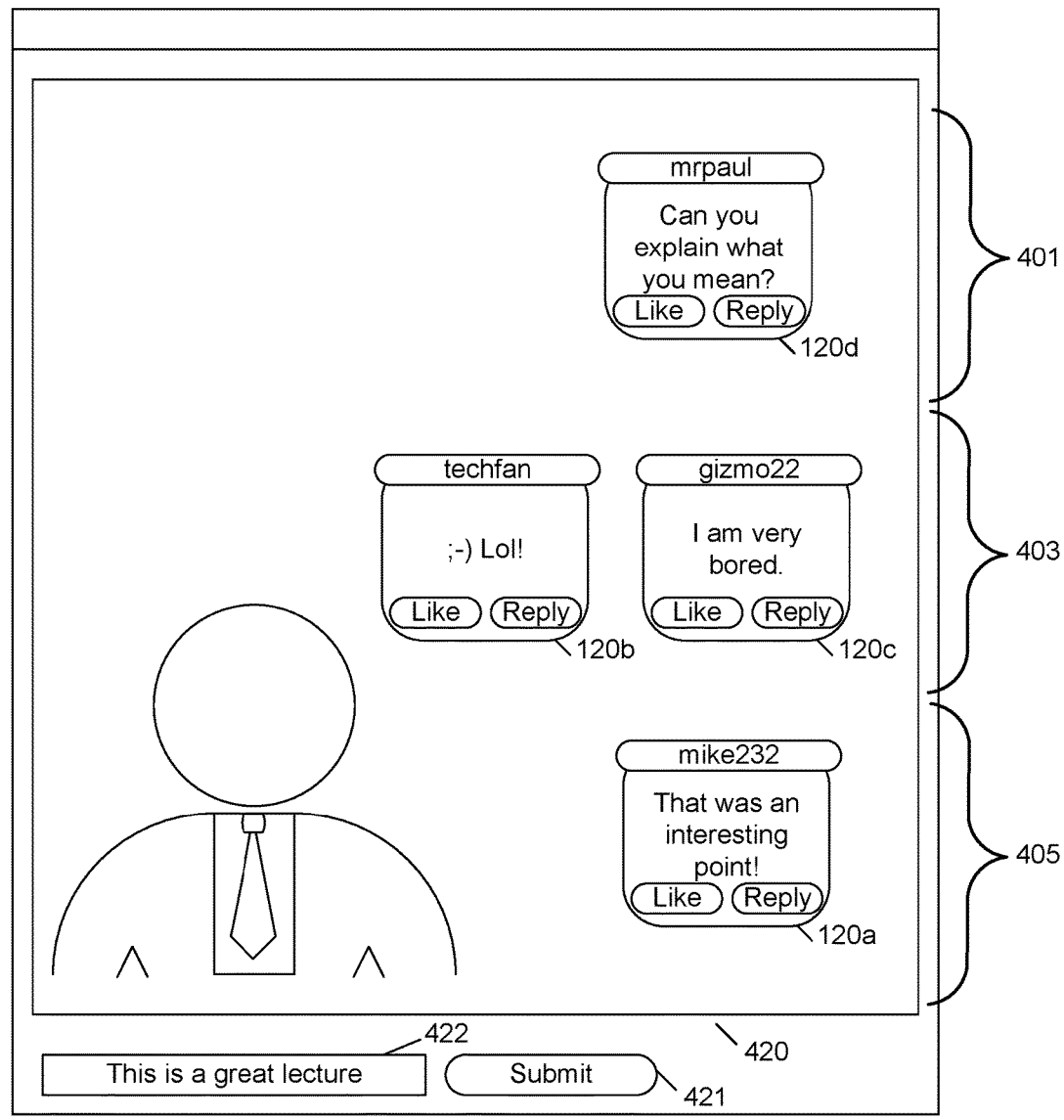
FIG. 4 is an illustration of an example user-interface that may be used to provide messages of message selections generated by the display engine for a message client associated with a participant.

FIG. 4 is an illustration of an example user-interface 400 that may be used to provide messages 120 of message selections 165 generated by the display engine 225 for a message client 113 associated with a participant 114.

As shown, the user-interface 400 includes a display window 420 where the content 135 associated with a group streaming activity may be presented. Within the display window 420 are three regions 401, 403, and 405 where messages 120 of the message selections 165 may be presented. In the example shown, four messages are displayed (i.e., the messages 120a, 120b, 120c, and 120d). More or fewer messages 120 may be presented or displayed in the display window 420. In addition, in some implementations, the messages 120 may be presented in a display window that is separate from the display window 420.

The user-interface 400 may also allow the associated participant 114 to generate messages 120 and to reply to messages 120. The user-interface 400 includes a box 422 where the participant 114 may enter text or other content for the message 120 (e.g., images, videos, and URLs or other references), and a user-interface element 421 labeled "Submit" that the participant 114 may select to generate the message 120 using the content entered into the box 422.

In the example shown, the participant 114 has entered the string "This is a great lecture" into the box 422. After the participant 114 selects the user-interface element 421, the message client 113 may generate and send a corresponding message 120 to the message engine 160.

The messages 120 shown in the display window 420 each include the name of the participant 114 that generated the message 120, the text or content of the message 120, and user-interface elements through which the participant 114 viewing the message 120 can either provide an indication of approval 125, or generate a reply to the message 120.

For example, the message 120a was authored by the participant 114 named "mike232." The content of the message 120a is "That was an interesting point!". If the participant 114 viewing the message 120a approves of the message 120a, they can select the user-interface element labeled "Like." If the participant 114 viewing the message 120a desires to reply to the message 120a, they can select the user-interface element labeled "Reply."

Each of the regions 401, 403, and 405 may be used to display messages 120 with different audience 163 sizes. The region 405 may be used to display messages 120 that are generated by participants 114 that share a neighborhood 161 with the participant 114 associated with the user-interface 400. As shown, the region 405 displays the message 120a which implies that the user "mike232" has a neighborhood 161 in common with the participant 114 associated with the user-interface 400.

The region 405 may be used to display messages 120 whose audience 163 has grown to include the participant 114 associated with the user-interface 400. As shown, the region 405 displays the messages 120b and 120c. The users "techfan" and "gizmo22" may not have a neighborhood 161 in common with the participant 114 associated with the user-interface 400. However, after the messages 120b and 120c received some number of indications of approval 125, their audiences 163 were increased to include the participant 114 associated with the user-interface 400.

The region 401 may be used to display messages 120 whose audience 163 has grown to include all participants 114 in the group streaming activity. As shown, the region 401 displays the message 120d. The user "mrpaul" may not have a neighborhood 161 in common with the participant 114 associated with the user-interface 400, but after the message 120d received more than the threshold 273 number of indications of approval 125, the audience 163 was increased to include all of the participants 114 in the group streaming activity.

Figure 5:
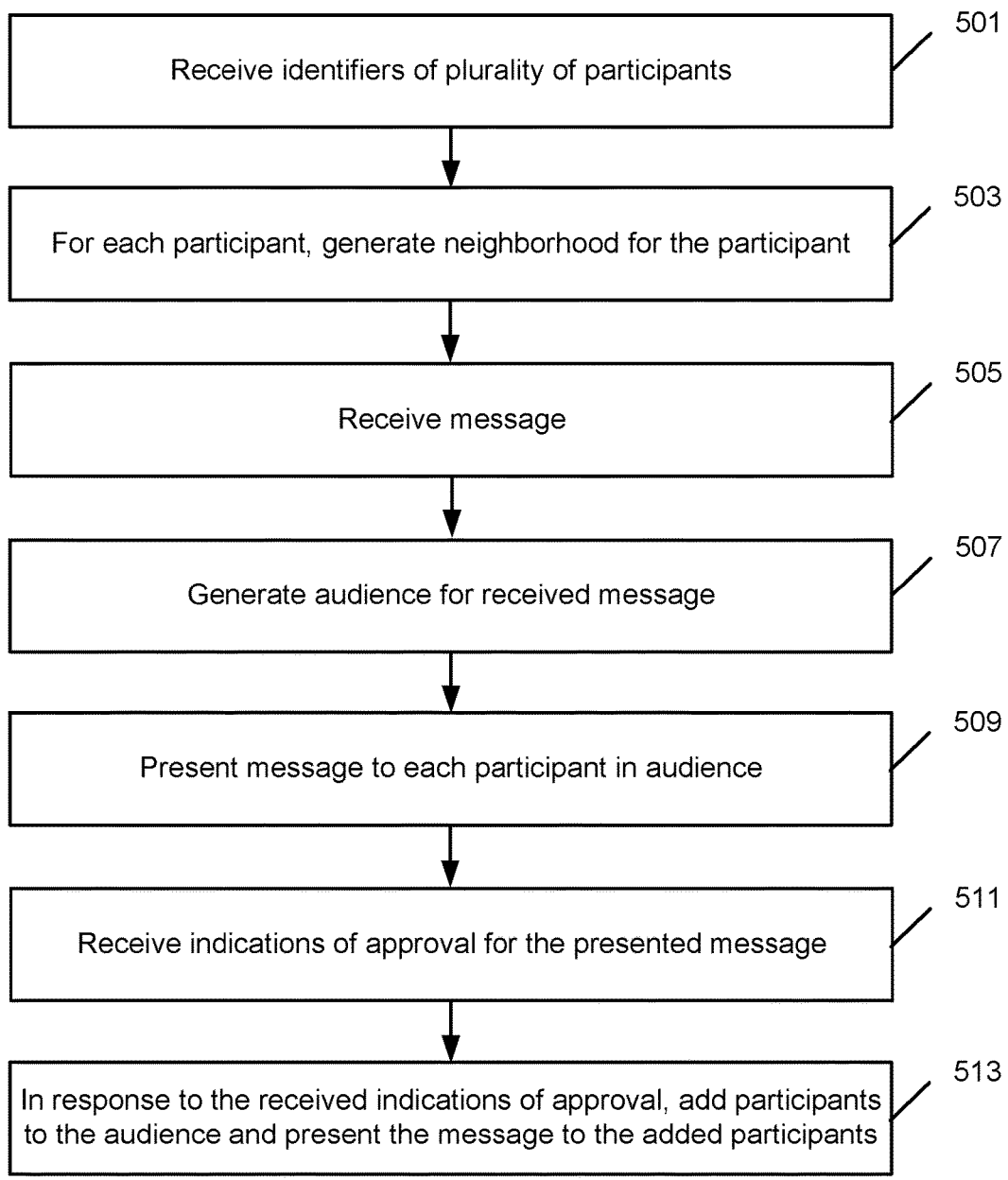
FIG. 5 is an operational flow of an implementation of a method for presenting messages.

FIG. 5 is an operational flow of an implementation of a method 500 for presenting messages. The method 500 may be implemented by the message engine 160.

At 501, identifiers of a plurality of participants are received. The plurality participants 114 may be received by the participant engine 205 of the message engine 160. The participants 114 may be associated with a group streaming activity provided by a content provider 130.

At 503, a neighborhood is generated for each participant. A neighborhood 161 may be generated for each participant 114 by the neighborhood engine 210 of the message engine 160. Each neighborhood 161 associated with a participant 114 may be a subset of the plurality of participants 114. A participant 114 may receive messages 120 from all of the participants 114 in the neighborhood 161 associated with the participant 114. Depending on the implementation, the neighborhood engine 210 may generate neighborhoods 161 using participant data 271, using social networking data 272, or using a data structure such as the circular structure 274.

For example, the neighborhood engine 210 may generate a neighborhood using a social graph associated with a social networking application. The neighborhood engine 210 may also generate a neighborhood 161 such that participants 114 who interacted with each other in a previous group streaming activity may share a neighborhood 161. Other factors may be considered such as the time that the participants 114 started or entered the group streaming activity.

At 505, a message is received. The message 120 may be received by the message engine 160 from a message client 113 associated with the participant 114 that generated the received message 114.

At 507, an audience is generated for the received message. The audience 163 may be generated by the audience engine 215. The audience 163 may be a subset of the plurality of participants 114. Depending on the implementation, the audience 163 may initially be the same as the neighborhood 161 associated with the participant 114 that generated the received message 120. Alternatively, the audience 163 may include each participant 114 that is associated with a neighborhood 161 that includes the participant 114 that generated the message 120.

At 509, the message is presented to each participant in the audience. The message 120 may be presented to each participant 114 in the audience 163 by the display engine 225. In some implementations, the message 120 may be provided along with other messages 120 by the display engine 225 of the message engine 160 as the message selections 165.

At 511, indications of approval are received for the presented message. The indications of approval 125 may be received by the audience engine 215 of the message engine 160. The indications of approval 125 may include "likes", "stars", "hearts" or other indications that the message 120 was liked or well received by the participants 114 in the group streaming activity. Depending on the implementation, the indications of approval 125 may include actions such as replying to the message 120, forwarding the message 120 to another participant 114, or quoting the message 120, for example.

At 513, participants are added to the audience and the message is presented to the added participants in response to the received indications of approval. The participants 114 may be added to the audience 163 by the audience engine 215. The number of participants 114 that are added to the audience 163 may be proportional to the number of indications of approval 125 that are received. The message 120 may then be provided to the participants 114 that were added to the audience 163 by the display engine 225 as the message selections 165.

Figure 6:
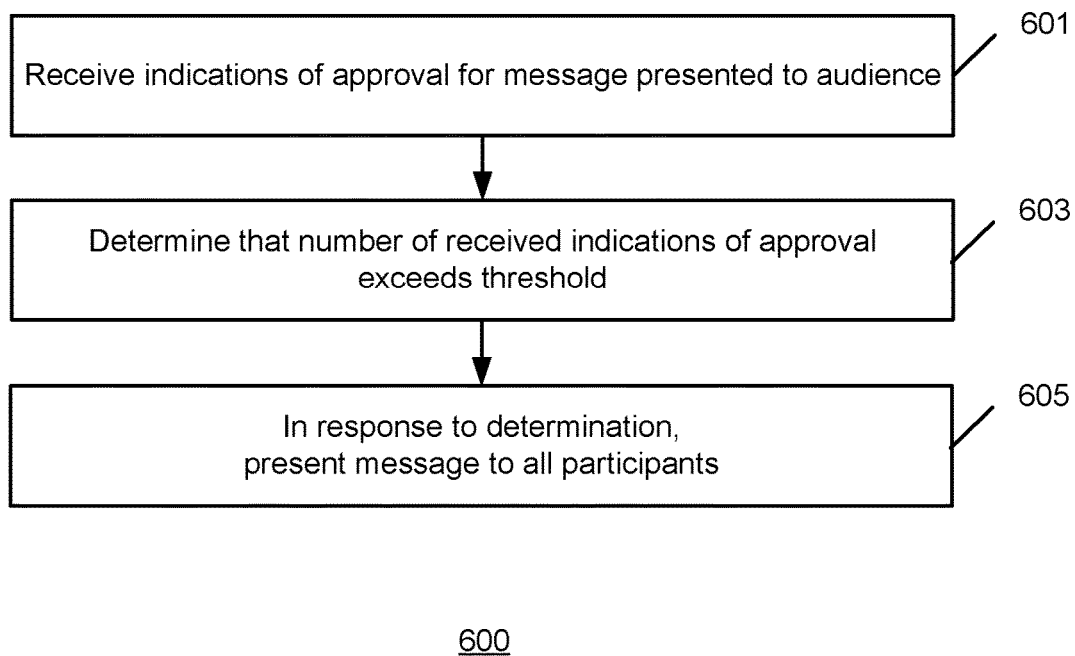
FIG. 6 is an operational flow an implementation of a method for presenting messages to participants based on indications of approval.

FIG. 6 is an operational flow an implementation of a method 600 for presenting messages to participants based on indications of approval. The method 600 may be implemented by the message engine 160.

At 601, indications of approval are received. The indications of approval 125 may be received by the audience engine 215 of the message engine 160. The indications of approval 125 may be for a message 120 that was presented to a subset of a plurality of participants 114 in a group streaming activity.

At 603, that a number of received indications of approval exceeds a threshold is determined. That the number of received indications of approval 125 exceeds a threshold 273 may be determined by the audience engine 215 of the message engine 160. The threshold 273 may be selected by a user or an administrator, may be based on the number of participants 114 in the group streaming activity, may be based on the number of messages 120 being generated by participants 114 in the group streaming activity, or some combination thereof, for example.

At 605, the message is presented to all of the participants in response to the determination. The message 120 may be presented to all the participants 114 in the group streaming activity by the display engine 225 of the message engine 160 as part of the message selections 165. The message 120 may be provided to all of the participants 114 by adding all of the participants 114 to the audience 163 associated with the message 120.

Figure 7:
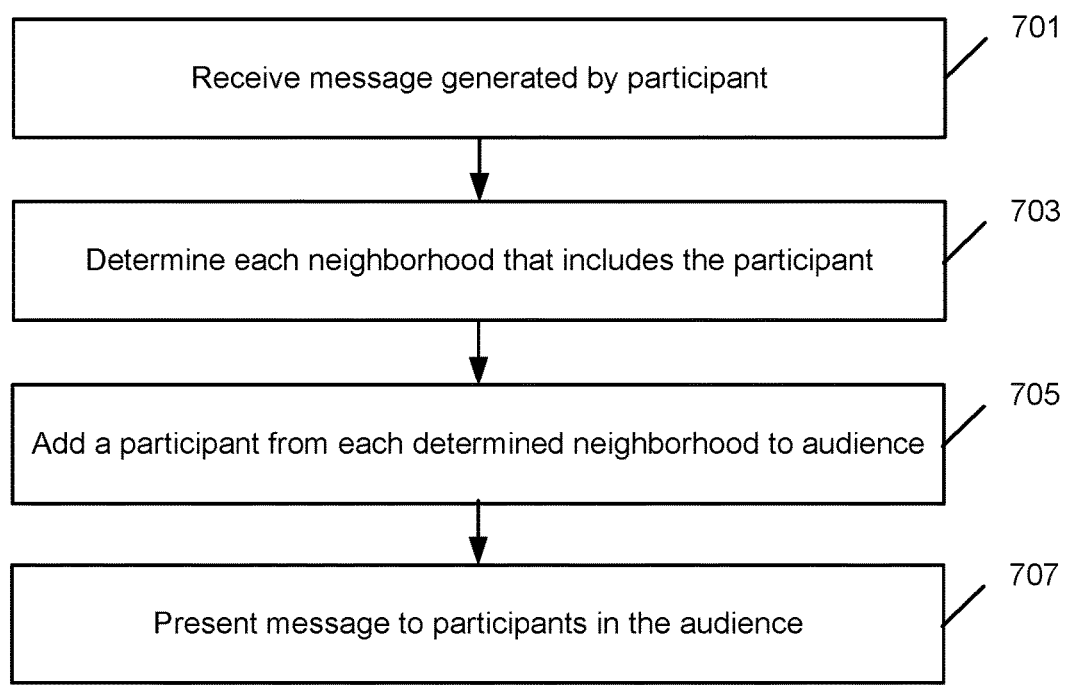
FIG. 7 is an operational flow of an implementation of a method for determining an audience for a message and for presenting the message to the participants in the determined audience.

FIG. 7 is an operational flow of an implementation of a method 700 for determining an audience for a message and for presenting the message to the participants in the determined audience. The method 700 may be implemented by the message engine 160.

At 701, a message is received. The message 120 may be received by the message engine 160 from a participant 114 in a group streaming activity.

At 703, each neighborhood that includes the participant is determined. Each neighborhood 161 that includes the participant 114 associated with the message 120 may be determined by the neighborhood engine 210 of the message engine 160.

At 705, a participant from each of the determined neighborhoods is added to the audience. The participant 114 may be added to the audience 163 by the audience engine 215 of the message engine 160.

At 707, the message is presented to the participants in the audience. The message 120 may be presented to the participants 114 in the audience 163 by the display engine 225 as part of the message selections 165.

Figure 8:
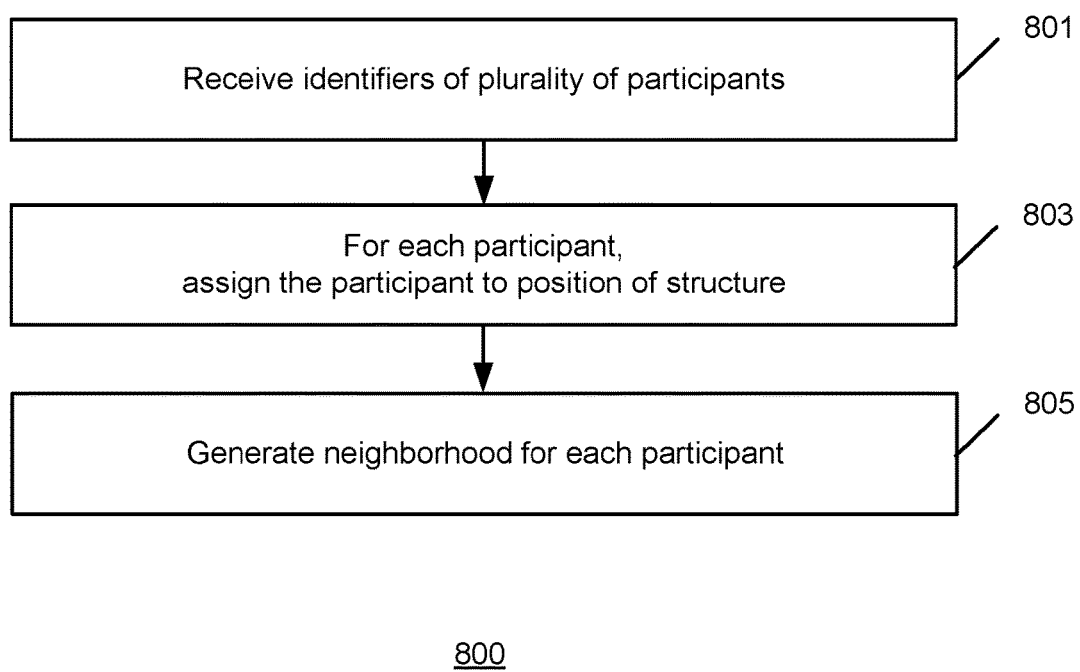
FIG. 8 is an operational flow of an implementation of a method for generating neighborhoods for participants using a structure.

FIG. 8 is an operational flow of an implementation of a method 800 for generating neighborhoods for participants using a structure. The method 800 may be implemented by the message engine 160.

At 801, identifiers of a plurality of participants are received. The plurality participants 114 may be received by the participant engine 205 of the message engine 160. The participants 114 may be associated with a group streaming activity provided by a content provider 130.

At 803, each participant is assigned to a position of a structure. The structure may be a circular structure. The participants may be assigned by the participant engine 205 of the message engine 160. The participants 114 may be assigned randomly, based on the participant data 271, based on the social networking data 272, or some combination thereof, for example.

At 805, a neighborhood is generated for each participant. The neighborhoods 161 may be generated by the neighborhood engine 210 of the message engine 160.

Figure 9:
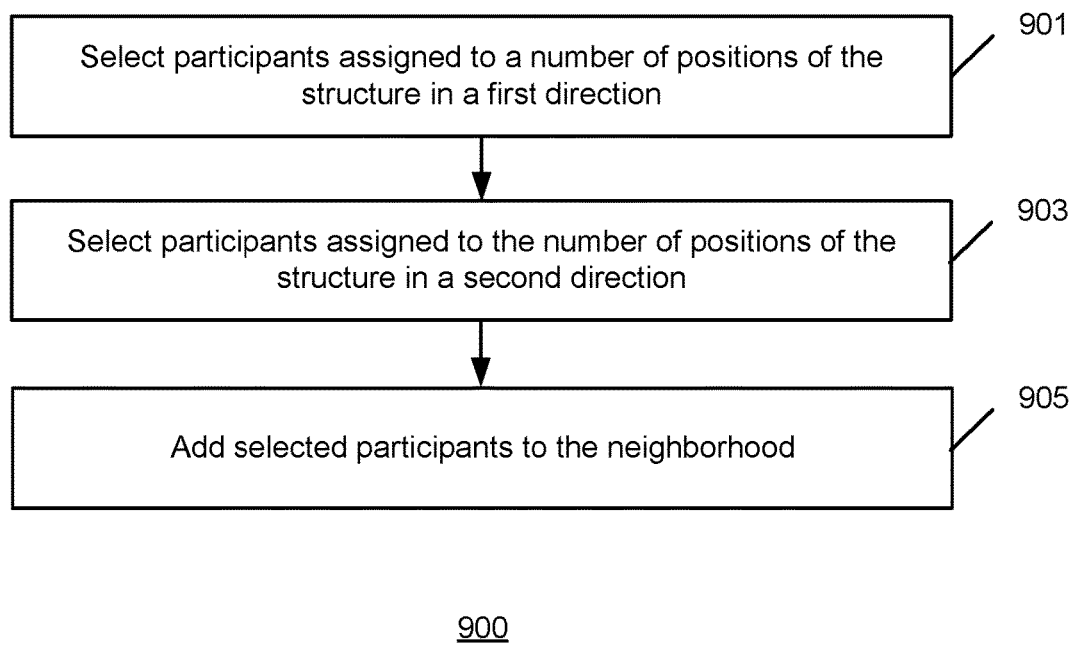
FIG. 9 is an operational flow of an implementation of a method for generating a neighborhood for a participant using a structure.

FIG. 9 is an operational flow of an implementation of a method 900 for generating a neighborhood for a participant using a structure. The method 900 may be implemented by the message engine 160.

At 901, participants assigned to a number of positions of the structure in a first direction from the position of the participant 114 associated with the neighborhood 161 are selected. The first direction may be the clockwise direction. The structure may be a circular structure. The participants 114 may be selected by the audience engine 215 of the message engine 160 by starting from the position of the participant 114 in the circular structure 274 and moving the number of positions in the clockwise direction. The participants 114 corresponding to the positions that are passed while moving in the clockwise direction may be selected.

At 903, participants assigned to the number of positions of the structure in a second direction from the position of the participant 114 associated with the neighborhood 161 are selected. The second direction may be the counterclockwise direction. The participants 114 may be selected by the audience engine 215 of the message engine 160 by starting from the position of the participant 114 in the circular structure 274 and moving the number of positions in the counterclockwise direction. The participants 114 corresponding to the positions that are passed while moving in the counterclockwise direction may be selected.

At 905, the selected participants are added to the neighborhood. The selected participants 114 may be added to the neighborhood 161 by the neighborhood engine 210 of the message engine 160.

FIG. 10 shows an exemplary computing environment in which example embodiments and aspects may be implemented. The computing device environment is only one example of a suitable computing environment and is not intended to suggest any limitation as to the scope of use or functionality.

Numerous other general purpose or special purpose computing devices environments or configurations may be used. Examples of well-known computing devices, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 10, an exemplary system for implementing aspects described herein includes a computing device, such as computing device 1000. In its most basic configuration, computing device 1000 typically includes at least one processing unit 1002 and memory 1004. Depending on the exact configuration and type of computing device, memory 1004 may be volatile (such as random access memory (RAM)), non-volatile (such as read-only memory (ROM), flash memory, etc.), or some combination of the two. This most basic configuration is illustrated in FIG. 10 by dashed line 1006.

Computing device 1000 may have additional features/functionality. For example, computing device 1000 may include additional storage (removable and/or non-removable) including, but not limited to, magnetic or optical disks or tape. Such additional storage is illustrated in FIG. 10 by removable storage 1008 and non-removable storage 1010.

Computing device 1000 typically includes a variety of computer readable media. Computer readable media can be any available media that can be accessed by the device 1000 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 1004, removable storage 1008, and non-removable storage 1010 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1000. Any such computer storage media may be part of computing device 1000.

Computing device 1000 may contain communication connection(s) 1012 that allow the device to communicate with other devices. Computing device 1000 may also have input device(s) 1014 such as a keyboard, mouse, pen, voice input device, touch input device, etc. Output device(s) 1016 such as a display, speakers, printer, etc. may also be included. All these devices are well known in the art and need not be discussed at length here.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

In an implementation, a system for displaying messages to participants in group streaming activities is provided. The system includes at least one computing device and a message engine. The message engine is adapted to: receive identifiers of a plurality of participants; for each participant of the plurality of participants, generate a neighborhood for the participant, wherein each neighborhood comprises a subset of participants of the plurality of participants; receive a message generated by a participant of the plurality of participants; generate an audience for the message based on the neighborhoods that include the participant that generated the message, wherein the audience comprises a subset of participants of the plurality of participants; present the message to the participants in the generated audience; receive indications of approval for the presented message; and in response to the received indications of approval, add participants of the plurality of participants to the generated audience and present the message to the added participants.

Implementations may include some or all of the following features. The message engine adapted to present the message to the participants in the generated audience may include the message engine adapted to present the messages to the participants in the generated audience along with steaming content. The message engine adapted to generate the neighborhood for the participant may include the message engine adapted to select participants from the plurality of participants, and add the selected participant to the neighborhood for the participant. The message engine may be further adapted to determine that a number of indications of approval received for the presented message exceeds a threshold, and in response to the determination, present the message to a presenter associated with streaming content. The number of participants added to the generated audience may be based on a number of indications of approval received for the presented message. The message engine may be further adapted to: determine that a number of indications of approval received for the presented message exceeds a threshold; and in response to the determination, present the message to all of the participants of the plurality of participants. The message engine adapted to generate the audience for the message based on the neighborhoods that include the participant that generated the message may include the message engine adapted to: determine each neighborhood that includes the participant that generated the message; and for each determined neighborhood, add a participant of the determined neighborhood to the audience. The message engine may be further adapted to: for each participant of the plurality of participants, assign the participant to a position of a plurality of positions of a structure, wherein the positions are arranged in a first direction and a second direction around the structure. The message engine adapted to generate the neighborhood for the participant may include the message engine adapted to: select participants assigned to a number of positions of the circular structure in the clockwise direction from the position assigned to the participant associated with the neighborhood; select participants assigned to the number of positions of the circular structure in the counterclockwise direction from the position assigned to the participant associated with the neighborhood; and add the selected participants to the neighborhood for the participant. The message engine adapted to assign the participant to the position of the plurality of positions may include the message engine adapted to: select a position of the plurality of positions that has not yet been assigned; and assign the participant to the selected position. The message engine adapted to select the position of the plurality of positions that has not yet been assigned may include one or more of: the message engine adapted to randomly select the position; the message engine adapted to select the position based on social networking data associated with the participants of the plurality of participants, and the message engine adapted to select the position based on preference data associated with the participants of the plurality of participants.

In an implementation, a method for displaying messages to participants in group streaming activities is provided. The method includes: receiving a message generated by a participant of a plurality of participants by a computing device, wherein each participant is associated with a neighborhood of a plurality of neighborhoods, and each neighborhood includes a subset of the participants of the plurality of participants; generating an audience for the message based on the neighborhoods that include the participant that generated the message by the computing device, wherein the audience comprises a subset of participants of the plurality of participants; presenting the message to the participants in the generated audience by the computing device; receiving indications of approval for the presented message by the computing device; in response to the received indications of approval, adding participants of the plurality of participants to the generated audience by the computing device; presenting the message to the added participants by the computing device; determining that a number of indications of approval received for the presented message exceeds a threshold by the computing device; and in response to the determination, presenting the message to all of the participants of the plurality of participants by the computing device.

Implementations may include some or all of the following features. Generating the neighborhood for the participant may include selecting participants from the plurality of participants, and adding the selected participants to the neighborhood for the participant. In response to the determination, the message may be presented to a presenter associated with streaming content. A number of participants added to the generated audience may be based on a number of indications of approval received for the presented message.

In an implementation, a system for displaying messages to participants of group streaming activities is provided. The system includes at least one computing device and a message engine. The message engine is adapted to: receive identifiers of a plurality of participants; for each participant of the plurality of participants, assign the participant to a position of a plurality of positions of a structure, wherein the positions are arranged in a first direction and a second direction around the structure; for each participant of the plurality of participants, generate a neighborhood for the participant, wherein each neighborhood comprises a subset of participants of the plurality of participants, by: selecting participants assigned to a number of positions of the structure in the first direction from the position assigned to the participant associated with the neighborhood; selecting participants assigned to the number of positions of the circular structure in the second direction from the position assigned to the participant associated with the neighborhood; and adding the selected participants to the neighborhood for the participant; receive a message generated by a participant of the plurality of participants; generate an audience for the message based on the neighborhoods that include the participant that generated the message, wherein the audience comprises a subset of participants of the plurality of participants; and present the message to the participants in the generated audience.

Implementations may include some or all of the following features. The message engine may be further adapted to determine that a number of indications of approval received for the presented message exceeds a threshold; and in response to the determination, present the message to all of the participants of the plurality of participants. A participant may be presented with messages generated by all of the participants that are in the neighborhood associated with the participant. The message engine adapted to generate the audience for the message based on the neighborhoods that include the participant that generated the message may include the message engine adapted to: determine each neighborhood that includes the participant that generated the message; and for each determined neighborhood, add a participant of the determined neighborhood to the audience. The message engine adapted to generate a neighborhood may include the message engine adapted to generate the neighborhood using a social graph.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A computer system for displaying messages to participants in group streaming activities, comprising:
   at least one computing device; and
   a message engine adapted to:
      receive identifiers of a plurality of participants in a computerized group content streaming event, with the participants being computerized components in the computer system, and with the content streaming event comprising sending continuous streaming content to the participants;
      for a participant of the plurality of participants in the computer system, generate a computer-readable neighborhood for distributing messages from the participant in conjunction with the streaming event, with the messages being different from the streaming content, wherein the neighborhood comprises a subset of participants of the plurality of participants and does not include all the plurality of participants;
      receive a computerized message generated by the participant for distribution to other participants of the plurality of participants in conjunction with the streaming event;
      generate a computer-readable audience for the message based on the neighborhood, wherein the audience comprises a subset of participants of the plurality of participants in the streaming event and does not include all the plurality of participants;
      present the message to the participants in the generated audience in conjunction with the streaming event;
      receive computerized indications of approval for the presented message from participants in the plurality of participants in the streaming event; and
      in response to the received indications of approval, add participants of the plurality of participants in the streaming event to the generated audience and present the message to the added participants in conjunction with the streaming event.

2. The system of claim 1, wherein the message engine being adapted to present the message to the participants in the generated audience comprises the message engine being adapted to present the messages to the participants in the generated audience along with streaming content.

3. The system of claim 1, wherein the message engine being adapted to generate the neighborhood for the participant comprises the message engine being adapted to select participants from the plurality of participants, and add the selected participants to the neighborhood for the participant.

4. The system of claim 1, wherein the message engine is further adapted to:
   determine that a number of indications of approval received for the presented message exceeds a threshold; and
   in response to the determination, present the message to a presenter of the streaming content, with the presenter being a computerized component in the computer system.

5. The system of claim 1, wherein a number of participants added to the generated audience is based on a number of indications of approval received for the presented message.

6. The system of claim 1, wherein the message engine is further adapted to:
   determine that a number of indications of approval received for the presented message exceeds a threshold; and
   in response to the determination, present the message to all of the participants of the plurality of participants in conjunction with the streaming event.

7. The system of claim 1, wherein the message engine being adapted to generate the audience for the message based on the neighborhood comprises the message engine being adapted to:
   determine each neighborhood that includes the participant that generated the message; and
   for each determined neighborhood, add a participant of the determined neighborhood to the audience.

8. The system of claim 1, wherein the message engine is further adapted to:
   for each of multiple participants of the plurality of participants, assign the participant to a position of a plurality of positions of a structure in the computer system, wherein the positions are arranged in a first direction and a second direction around the structure, and wherein the generating of the neighborhood for the participant comprises basing selection of participants for inclusion in the neighborhood on proximity of the selected participants to the participant for which the neighborhood is being generated in one or more of the first direction and the second direction around the structure.

9. The system of claim 8, wherein the message engine being adapted to generate the neighborhood for the participant comprises the message engine being adapted to:
   select participants assigned to a number of positions of the structure in the first direction from the position assigned to the participant associated with the neighborhood;
   select participants assigned to the number of positions of the structure in the second direction from the position assigned to the participant associated with the neighborhood; and
   add the selected participants to the neighborhood for the participant.

10. The system of claim 8, wherein the message engine being adapted to assign the participant to the position of the plurality of positions comprises the message engine being adapted to:
    select a position of the plurality of positions that has not yet been assigned; and
    assign the participant to the selected position.

11. The system of claim 10, wherein the message engine being adapted to select the position of the plurality of positions that has not yet been assigned comprises one or more of: the message engine being adapted to randomly select the position; the message engine being adapted to select the position based on social networking data associated with the participants of the plurality of participants; and the message engine being adapted to select the position based on preference data associated with the participants of the plurality of participants.

12. A computer-implemented method for displaying messages to participants in group streaming activities, comprising:

receiving a message generated by a participant of a plurality of participants by a computing device for distribution to other participants of the plurality of participants in conjunction with a computerized group content streaming event, with the participants being participants in the streaming event, with the participants being computerized components in a computer system, and with the content streaming event comprising sending continuous streaming content to the participants, with the messages being different from the streaming content, wherein a participant of the plurality of participants is associated with a neighborhood of a plurality of neighborhoods for distributing messages from the participants in conjunction with the streaming event, with the messages being different from the streaming content, and each neighborhood includes a subset of the participants of the plurality of participants and does not include all the plurality of participants;

generating a computer-readable audience for the message based on one or more of the neighborhoods that include the participant that generated the message by the computing device, wherein the audience comprises a subset of participants of the plurality of participants in the streaming event and does not include all the plurality of participants;

presenting the message to the participants in the generated audience by the computing device in conjunction with the streaming event;

receiving computerized indications of approval for the presented message by the computing device from participants in the plurality of participants in the streaming event;

in response to the received indications of approval, adding participants of the plurality of participants in the streaming event to the generated audience by the computing device; and presenting the message to the added participants by the computing device in conjunction with the streaming event.

13. The method of claim 12, wherein generating the audience for the message based on one or more of the neighborhoods that include the participant that generated the message comprises:

determining each neighborhood that includes the participant that generated the message; and for each determined neighborhood, adding a participant of the determined neighborhood to the audience.

14. The method of claim 12, further comprising:

determining that a number of indications of approval received for the presented message exceeds a threshold by the computing device; and in response to the determination, presenting the message to a presenter of the streaming content.

15. The method of claim 12, wherein a number of participants added to the generated audience is based on a number of indications of approval received from the plurality of participants for the presented message.

16. A computer system for displaying messages to participants of group streaming activities, comprising:

at least one computing device; and a message engine adapted to:

receive identifiers of a plurality of participants in a computerized group content streaming event, with the participants being computerized components in the computer system, and with the content streaming event comprising sending continuous streaming content to the participants;

for each participant of the plurality of participants, assign the participant to a position of a plurality of positions of a structure in the computer system, wherein the positions are arranged in a first direction and a second direction around the structure;

for each participant of the plurality of participants, generate a neighborhood for distributing messages from the participant in conjunction with the streaming event, with the messages being different from the streaming content, wherein each neighborhood comprises a subset of participants of the plurality of participants that includes less than all the plurality of participants, with the generating of the neighborhood for the participant comprising basing selection of participants for inclusion in the neighborhood on proximity of the selected participants to the participant for which the neighborhood is being generated in one or more of the first direction and the second direction around the structure;

receive a message generated by a participant of the plurality of participants for distribution to other participants of the plurality of participants in conjunction with the streaming event;

generate a computer-readable audience for the message based on one or more of the neighborhoods that include the participant that generated the message, wherein the audience comprises a subset of participants of the plurality of participants in the streaming event and does not include all the plurality of participants; and present the message to the participants in the generated audience in conjunction with the streaming event.

17. The system of claim 16, wherein the message engine is further adapted to determine that a number of indications of approval received for the presented message exceeds a threshold; and in response to the determination, present the message to all of the participants of the plurality of participants in conjunction with the streaming event.

18. The system of claim 16, wherein the messaging engine is adapted to present a participant with messages generated by all of the participants that are in the neighborhood associated with the participant.

19. The system of claim 16, wherein the message engine being adapted to generate the audience for the message based on the one or more of the neighborhoods that include the participant that generated the message comprises the message engine being adapted to:

determine each neighborhood that includes the participant that generated the message; and for each determined neighborhood, add a participant of the determined neighborhood to the audience.

20. The system of claim 17, wherein the message engine being adapted to generate a neighborhood comprises the message engine being adapted to generate the neighborhood using a social graph.

* * * * *